Oct. 12, 1937.          J. H. OWENS          2,095,281
ELECTRIC MOTOR
Filed May 6, 1936
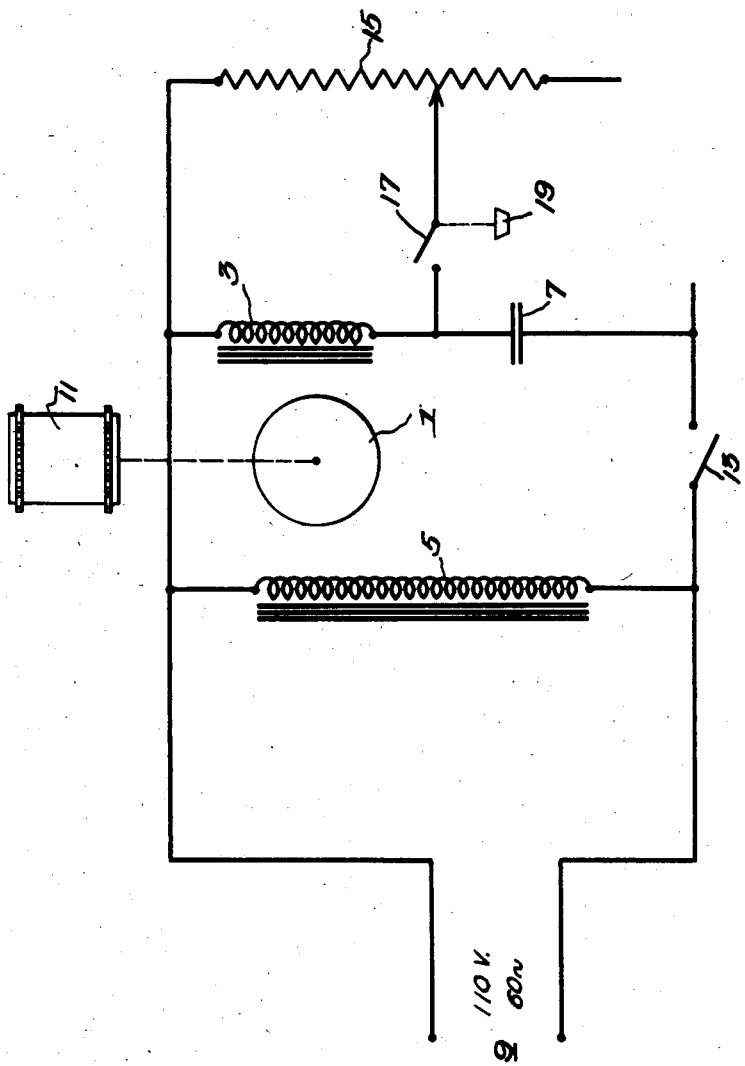
INVENTOR
JAMES H. OWENS
BY
ATTORNEY Patented Oct. 12, 1937

2,095,281

UNITED STATES PATENT OFFICE 2,095,281

ELECTRIC MOTOR

James H. Owens, Idlewylde, Md., assignor to Radio Corporation of America, a corporation of Delaware Application May 6, 1936, Serial No. 78,086

4 Claims. (Cl. 172—278)

This invention relates to electric motors, and more particularly to induction motors of the capacitor type.

It is well known that single phase induction motors must be supplied with some form of starting device in order to make them self-starting. One such means, for example, is an auxiliary field winding arranged in such a manner that the current therethrough is displaced in phase from the current through the main, or running, winding of the motor. It is also well known that motors of this type are arranged to operate at a fixed speed dependent upon the frequency of alternation of the source of current supply and upon the number of field poles used.

In certain applications where motors of this type may be used advantageously, it may also be desirable to operate the motor at more than one speed. For example, in moving picture projectors, it is desirable to advance the film at one rate where the film has recorded thereon a sound record to accompany the action, but at a much slower rate when a silent film is projected. Similarly, in some cases it is desirable to operate a phonograph turntable at the standard speed of 78 R. P. M., for example, while in other cases it is desirable to operate the turntable at a reduced speed of 33⅓ R. P. M. Perhaps the most obvious way of providing both speeds in connection with a single motor of the type under consideration is to interpose a reduction gear mechanism between the motor and the driven parts. This, however, adds greatly to the cost of the equipment, aside from being objectionable from a mechanical standpoint where uniform speed is desired, since gears cannot be cut perfectly and their use invariably results in slight fluctuations of rotation of the driven elements.

The primary object of my invention is to provide an improved motor of the type set forth which will not be subject to the foregoing and other disadvantages of similar motors of the prior art.

More specifically, it is an object of my invention to provide an improved induction motor which may be operated at two or more speeds within predetermined limits.

Another object of my invention is to provide motors of the type aforesaid with a simple speed control device.

It is also an object of my invention to provide a method of readily converting existing induction motors now arranged for single speed operation into motors which may be operated at more than one speed, which method will be inexpensive and simple to carry out.

In accordance with my invention, I insert, in an induction motor which is provided with an auxiliary, or starting, winding, a potentiometer, or variable resistor, across said auxiliary winding and by adjustment of the potentiometer, the effective inductance and reactance of said winding may be varied. This, in turn, will vary the torque, and in this manner, the speed of the motor and of the parts driven thereby may be adjusted.

The novel features that I consider characteristic of my invention are set forth with particularity in the appended claims. The invention itself, however, both as to its organization and method of operation, together with additional objects and advantages thereof, will best be understood from the following description of one embodiment thereof when read in connection with the accompanying drawing wherein the single figure shows a wiring diagram of a capacitor type induction motor arranged to drive a moving picture machine.

Referring more specifically to the drawing, I have shown, diagrammatically, a motor 1 provided with a starting winding 3 and running winding 5 connected in parallel, the winding 3 having serially connected thereto a capacitor 7 for producing a phase displacement between the current supplied to the two windings from a suitable alternating current source 9. The motor 1 may be employed for driving any suitable apparatus, and in the drawing is shown as coupled to the sprocket 11 of a moving picture projector, for example. To start the motor, a switch 13 is closed whereupon current is supplied through the winding 3 and the capacitor 7 as well as to the winding 5, but since the two currents are out of phase, the armature is given a starting impulse and thereafter continues to rotate. In normal operation, the switch 13 may thereafter remain either closed or open, depending upon the particular design of the motor.

For controlling the speed of the motor, I provide a variable resistor 15 connected in shunt relation to the starting winding 3. A switch 17 is provided for connecting and disconnecting the resistor 15 in the circuit, and this switch may either be manually operable, as by a knob 19, and may, if desired, be combined with the potentiometer 15 in a single unit, or it may be speed controlled from the motor 1, as by a centrifugal governor or relay. In any event, it will be obvious that when the switches 13 and 17 are both closed, a portion of the current which would normally flow through the inductance or winding 3 is diverted through the resistor 15. The effect of the resistor 15 is, therefore, to change the effective inductance and reactance of the winding 3, and, since it places a load on the capacitor 7, it also changes the effective capacitance and reactance of the capacitor, the result being that the tuning of the series connected inductance 3 and capacitance 7 is changed. In other words, the phase displacement between the current in the running winding or inductance 5 and that in the starting winding 3 is changed, and therefore the motor will rotate at a slower speed depending upon the adjustment of the potentiometer 15. In some cases, the motor may not start with the switch 17 in closed position. Hence, to start the motor, the switch 17 is opened and the switch 13 is closed. After the motor has begun to rotate, the switch 17 is also closed either manually, or it will be closed automatically when a predetermined speed has been reached, if controlled by a centrifugally operated device.

Although I have shown but a single form of my invention, it will be obvious to those skilled in the art that many modifications thereof are possible. I desire, therefore, that my invention shall not be limited except insofar as is necessitated by the prior art and by the spirit of the appended claims.

I claim as my invention:

1. In an electric motor, a running winding, a starting winding connected in parallel with said running winding, a capacitor in series with said starting winding for producing a phase displacement between the current in each of said windings, and a variable resistor associated with said starting winding and said capacitor for changing the effective reactance of said starting winding circuit whereby to control the speed of the motor.

2. In an electric motor, a pair of inductive windings connected in out of phase relationship with each other, a current controlling capacitor in series with one of said windings, and a variable resistor connected in shunt relation to said last named winding for varying said phase relationship.

3. In an electric motor, a pair of inductive windings connected in out of phase relationship with each other, a current controlling capacitor in series with one of said windings, a variable resistor arranged to be connected in shunt relation to said last named winding whereby to vary said phase relationship, and means for coupling and uncoupling said resistor and said last named winding.

4. In an electric motor, a pair of inductive windings connected in out of phase relationship, one of said windings being adapted to act as a starting winding, a current controlling capacitor in series with said starting winding, a manually operable variable resistor connected in shunt relation to said starting winding for varying said phase relationship whereby to vary the speed of the motor, and means in circuit with said resistor for rendering it ineffective during starting of the motor.

JAMES H. OWENS.